(12) United States Patent
McCoy

(10) Patent No.: US 11,769,997 B1
(45) Date of Patent: Sep. 26, 2023

(54) AUTOMATIC GROUND FAULT CIRCUIT INTERRUPTER (GFCI) RESET SYSTEM AND APPARATUS AND METHOD THEREFOR

(71) Applicant: Kenneth McCoy, Brambleton, VA (US)

(72) Inventor: Kenneth McCoy, Brambleton, VA (US)

(*) Notice: Subject to any disclaimer, the term of this patent is extended or adjusted under 35 U.S.C. 154(b) by 0 days.

(21) Appl. No.: 17/970,070

(22) Filed: Oct. 20, 2022

(51) Int. Cl.
*H02H 3/06* (2006.01)
*H02H 3/14* (2006.01)
*H02H 3/16* (2006.01)

(52) U.S. Cl.
CPC ............. *H02H 3/06* (2013.01); *H02H 3/14* (2013.01); *H02H 3/16* (2013.01)

(58) Field of Classification Search
CPC ..................................................... H02H 3/16
See application file for complete search history.

(56) References Cited

U.S. PATENT DOCUMENTS

| 6,006,849 A * | 12/1999 | Watkins ............... B62D 61/04 |
| | | 180/209 |
| 2008/0007879 A1* | 1/2008 | Zaretsky ............... H02H 3/335 |
| | | 340/650 |
| 2011/0216452 A1* | 9/2011 | Haines ................... H02H 3/00 |
| | | 361/42 |

* cited by examiner

*Primary Examiner* — Peter M Novak
(74) *Attorney, Agent, or Firm* — Patrick J. Stanzione; Stanzione & Associates, PLLC

(57) ABSTRACT

An automatic ground fault circuit interrupt (GFCI) circuit reset system and apparatus which attaches to a faceplate of an electrical outlet and includes a linear actuator. The linear actuator faces directly at a reset button on a GFCI outlet circuit and automatically actuates to depress the reset button after a predetermined amount of time after the GFCI outlet circuit becomes tripped and no longer transmits electrical power therefrom.

4 Claims, 3 Drawing Sheets

FIG. 3A
FIG. 3B
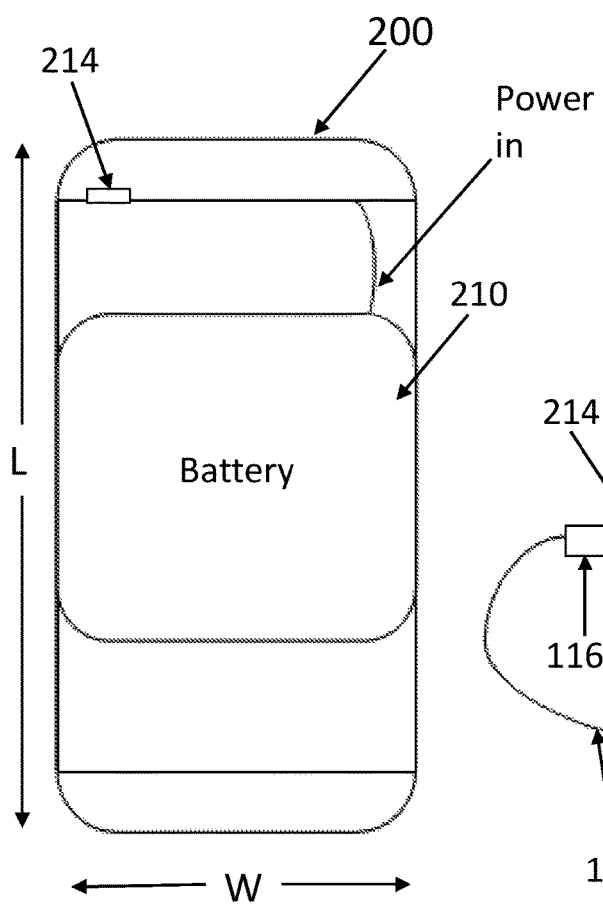
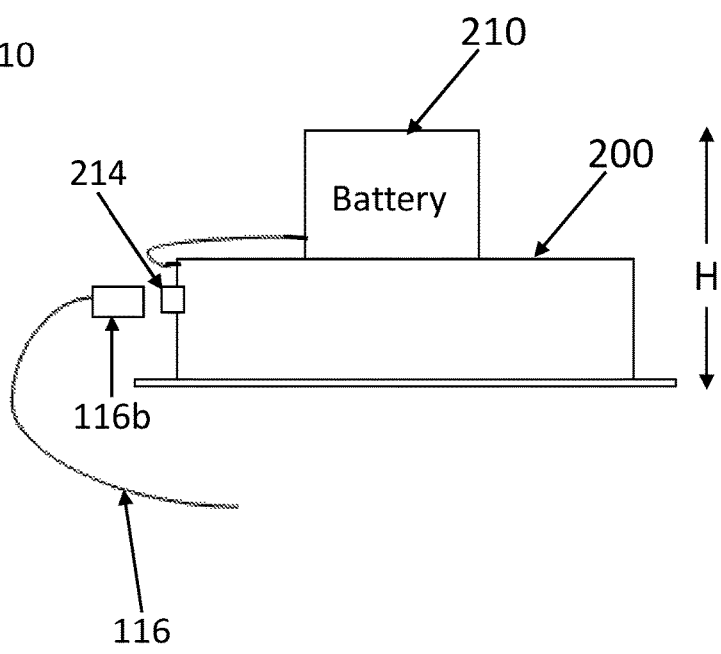

AUTOMATIC GROUND FAULT CIRCUIT INTERRUPTER (GFCI) RESET SYSTEM AND APPARATUS AND METHOD THEREFOR

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71(d).

BACKGROUND OF THE INVENTIVE CONCEPT

Field of the Invention

The present inventive concept relates to an automatic ground fault circuit interrupt (GFCI) circuit reset system and apparatus, and method therefor. More particularly, but not exclusively, this inventive concept relates to an automatic ground fault circuit interrupt (GFCI) circuit reset system and apparatus that determines whether a GFCI has been tripped, and automatically resets the GFCI when the determination has been made that the GFCI circuit has been tripped.

Description of the Related Art

Electrical outlets are vulnerable to catching on fire when more current is applied to the outlet than the outlet is manufactured to receive. As a result, a special type of circuit referred to as a ground fault circuit interrupter (GFCI) outlet circuit is commonly used as a "controlling" electrical outlet for homes, apartments, and businesses. The GFCI outlet circuit is configured to trip (interrupt the flow of electricity therethrough) when there is a difference between the amount of electricity flowing into the GFCI outlet circuit and the amount of electricity flowing out of the GFCI outlet circuit. GFCIs are also configured to trip when a ground fault occurs along an electrical circuit path in which the GFCI is connected, and it takes only 5 milli-amps (mA) of current leakage from a hot wire to the ground to cause a GFCI outlet circuit to trip. Other benefits of a GFCI outlet circuit include cutting off electricity to an electrical circuit path if a person starts to receive a shock from any of the electrical outlets in the electrical circuit path in which the GFCI outlet circuit is present. The GFCI outlet circuit senses this occurrence and will cut off the power to the electrical circuit path in which the GFCI outlet circuit is connected in less than one-tenth of a second.

Generally, an electrical circuit path will include several outlets to supply electricity at different locations along the path. The GFCI outlet circuit is generally placed at the most upstream location within an electrical circuit path. The GFCI outlet circuit is placed at the most upstream point in an electrical path so that if any one of the outlets downstream along this path experiences an abnormal electricity flow or grounding issue, the GFCI outlet circuit (controlling circuit) will trip, thus cutting off electricity to the outlet experiencing the abnormal electricity flow or grounding issue.

When builders, home inspectors, municipality inspectors and electricians need to test outlets along an electrical circuit path, they generally use a GFCI outlet tester. These GFCI outlet testers are operated by inserting the tester into the outlet to be tested, at which time a button on the GFCI outlet tester is pressed. When the button on the GFCI outlet tester is pressed while being inserted in the outlet being tested, the GFCI outlet tester will cause the controlling GFCI outlet circuit to trip and cut off electricity to the electrical path in which that outlet being tested is located. Each outlet within the electrical path is tested with a GFCI outlet tester to ensure that the controlling GFCI outlet circuit is functioning properly, and that the controlling GFCI outlet circuit will cut off electricity to the outlet being tested when an abnormality in electricity flow, or when a grounding issue arises with respect to the outlet being tested.

However, each time an outlet is tested with a GFCI outlet tester the controlling GFCI outlet circuit needs to be reset. Further, the controlling GFCI outlet circuit will need to be reset after each outlet within the electrical circuit path is tested. As a result, the person conducting the test on each of the outlets along an electrical path is required to go back to the controlling GFCI outlet circuit and reset it by pressing a reset button thereon. This usually requires either having to climb a plurality of stairs or flights of stairs of a home or other type of building to get to the controlling GFCI outlet circuit or having to go back and forth from an interior of a house or other type of building to reset the controlling GFCI outlet circuit. Alternatively, it is also common for two people to be required to be on site to test outlets, where one person will use a GFCI outlet tester at each of a plurality of outlets to be tested while a second person will remain stationed at the controlling GFCI outlet circuit to reset the controlling GFCI outlet circuit each time it is tripped with the GFCI tester. This requires twice the manpower, resulting in higher costs to conduct the tests on the outlets.

Accordingly, there is a need for a device that can automatically reset a GFCI outlet circuit after the GFCI outlet circuit is tripped.

There is also a need for a device that can continuously automatically reset a GFCI outlet circuit after the GFCI outlet circuit is tripped until each of a plurality of outlets within an electrical circuit path in which the GFCI is connected.

SUMMARY OF THE INVENTIVE CONCEPT

The present general inventive concept provides an automatic ground fault circuit interrupt (GFCI) circuit reset system and apparatus, and method therefor. More particularly, but not exclusively, this inventive concept relates to an automatic ground fault circuit interrupt (GFCI) circuit reset system and apparatus that determines whether a GFCI has been tripped, and automatically resets the GFCI when the determination has been made that the GFCI circuit has been tripped.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a system to automatically reset a ground fault circuit interrupter (GFCI) outlet, comprising: a U-shaped bracket with opposing ends thereof including wings extending perpendicularly outward, each of the opposing ends having a slot formed at a center thereof to receive therein corresponding faceplate screws of an electrical outlet face plate; a linear actuator attached to an inner surface of the bracket such that a retractable tip thereof faces a reset button on a GFCI outlet when face plate screws of an electrical outlet face plate are received in the corresponding slots of the bracket; an outlet plug configured to be inserted into the GFCI outlet to receive electrical power; a first conductor connector connected to the outlet plug to receive electrical power therefrom and separately connected to the linear actuator; and an external electrical housing electrically connected to the first conductor connector to receive electrical power therefrom and including an 18 volt DC battery and delay/relay circuitry, wherein when the electrical power thereto is terminated the delay/relay circuitry is configured to delay for a predetermined amount of time and then enable the 18 volt DC battery power to be provided to the linear actuator through the first conductor connector to actuate the retractable tip to extend outward and depress the reset button on the GFCI outlet and then reverse polarity to the linear actuator to cause the retractable tip to retract away from the reset button on the GFCI outlet.

In an exemplary embodiment, the delay and relay circuit may comprise: a second conductor connector to receive the electrical power from the first conductor connector and to supply the 18 volt DC battery power to the first conductor connector; an AC off power relay to receive the electrical power from the second conductor connector; a power step down relay to receive the 18 volt DC power from the DC battery, to step down the 18 volts to 12 volts and to supply the 12 volts to the AC off power relay; a delay relay to receive the electrical power from the AC off power relay and the 12 volts from the power step down relay, and configured to delay for a predetermined amount of time when electrical power is cut off from the AC off power relay and then enable transmission of the 12 volts; and a polarity relay configured to receive the 18 volts DC battery power from the DC battery and the 12 volts from the delay relay when the delay relay transmits the 12 volts, and to transmit the 18 volts DC battery power to the linear actuator through the second conductor connector and the first conductor connector to extend the retractable tip of the actuator outward when the 12 volts from the delay relay is received and then to transmit a reverse polarity to the linear actuator to retract the retractable tip of the actuator.

The foregoing and/or other features and utilities of the present general inventive concept may also be achieved by providing a system to automatically reset a ground fault circuit interrupter (GFCI) outlet, comprising: a bracket with opposing ends thereof extending perpendicularly outward, each of the opposing ends having a slot formed at a center thereof to receive therein corresponding face plate screws of an electrical outlet face plate; a linear actuator attached to an inner surface of the bracket such that a retractable tip thereof faces a reset button on a GFCI outlet when the screws of the face plate are received in the corresponding slots of the bracket; a connector connected to the linear actuator and having a DC port to receive a DC power; an external DC battery disposed outside the bracket to supply DC power to the connector; and a control unit connected to the DC battery to enable the DC power from the DC battery to be supplied to the linear actuator through the connector when power to the GFCI outlet is tripped to extend the retractable tip of the actuator and depress the reset button on the GFCI outlet, and then to enable a DC reverse polarity from the DC battery to the linear actuator through the connector to retract the retractable tip of the actuator.

The foregoing and/or other features and utilities of the present general inventive concept may also be achieved by providing a method of automatically resetting a ground fault circuit interrupter (GFCI) outlet, the method comprising: fastening an actuator directly adjacent a GFCI outlet such that a retractable tip of the actuator depresses a reset button on the GFCI outlet when the actuator receives a DC power; detecting when the GFCI outlet loses power thereto; and supplying a DC power to the actuator when it is detected that the GFCI outlet loses power to cause the retractable tip of the actuator to depress the reset button on the GFCI outlet, and then reversing the polarity of the DC power to the actuator to retract the tip of the actuator.

BRIEF DESCRIPTION OF THE DRAWINGS

These and/or other features and utilities of the present inventive concept will become apparent and more readily appreciated from the following description of the embodiments, taken in conjunction with the accompanying drawings of which:

FIG. 3A illustrates a top view of an electrical circuit control housing, according to an exemplary embodiment of the present inventive concept; and FIG. 3B illustrates a side view of the electrical circuit control housing according to the exemplary embodiment of FIG. 3A.

Figure 1:
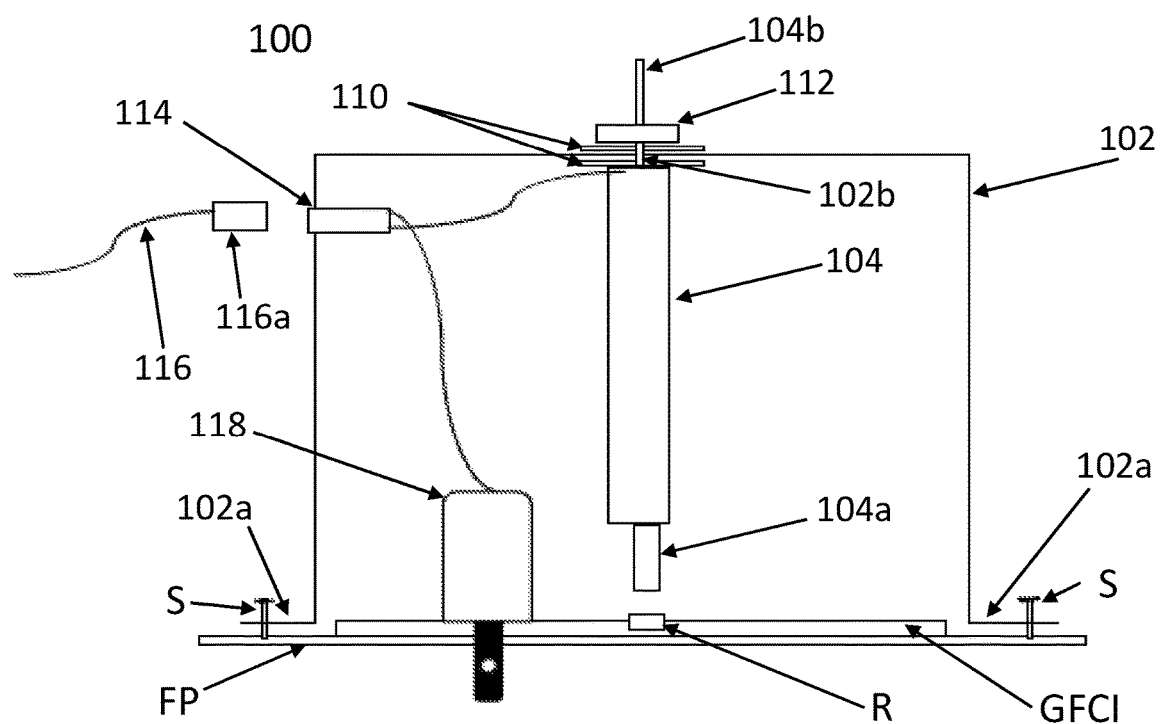
FIG. 1 illustrates a perspective view of an automatic GFCI reset apparatus, according to an exemplary embodiment of the present inventive concept.

The drawings illustrate a few example embodiments of the present inventive concept, and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept may be omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description herein. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

Hereinafter, one or more exemplary embodiments of the present general inventive concept will be described in detail with reference to accompanying drawings.

Example embodiments of the present general inventive concept are directed to an automatic ground fault circuit interrupt (GFCI) circuit reset system and apparatus. More particularly, but not exclusively, this inventive concept relates to an automatic ground fault circuit interrupt (GFCI) circuit reset system and apparatus that determines whether a GFCI has been tripped, and automatically resets the GFCI when the determination has been made that the GFCI circuit has been tripped.

Figure 2:
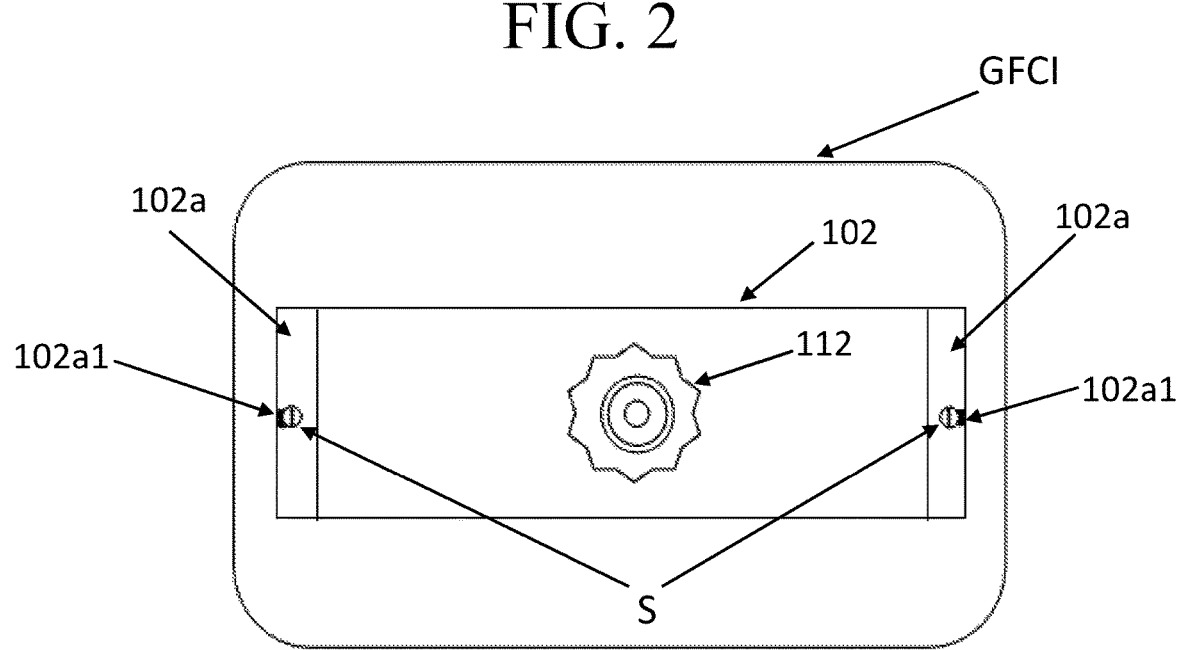
FIG. 2 illustrates a top view of the automatic GFCI reset apparatus according to FIG. 1.

FIG. 1 illustrates a perspective view of an automatic GFCI reset apparatus 100 according to an exemplary embodiment of the present inventive concept. FIG. 2 illustrates a top view of the automatic GFCI reset apparatus 100 according to the exemplary embodiment of FIG. 1.

Referring to FIGS. 1 and 2, the automatic GFCI reset apparatus 100 according to the present exemplary embodiment can include a metal bracket 102 formed in a rectangular shape with a length approximately equal to the length of a GFCI outlet. It is to be noted that the bracket 102 can alternatively be formed of any equivalent type of material which will provide the intended purposes of providing a bracket as described herein, without departing from the spirit and scope of the overall inventive concept. It is also noted that the bracket 102 can have any equivalent type shape which will enable the bracket 102 perform the intended purposes of engaging with and being secured to screws of an electrical outlet face plate, as described in more detail below.

The bracket 102 of the automatic GFCI reset apparatus 100 can be provided in a U-shape, and preferably includes a wing 102a extending outwardly and perpendicular from opposite ends of the U-shaped bracket. In other words, a respective wing 102a can extend outwardly at an angle perpendicular to two opposite sides of the bracket 102. Each of the wings 102a can include a slot 102a1 formed into a middle section thereof to receive a standard face plate screw S, which is used to hold a standard face plate FP in place around the GFCI outlet circuit. Outer edges of the wings 102a are preferably spaced apart by a distance slightly larger than a distance between the face plate screws S such that when the opposite outer sides of the bracket 102 are forced toward each other the slots 102a1 will receive the respective screws S therein. More specifically, to attach the bracket 102 to the standard face plate screws S the face plate screws S are first loosened enough such that the screws S are withdrawn from the fact plate FP by an amount equal to or slightly greater than the thickness of the wings 102a of the bracket 102. The bracket 102 and wings 102a are preferably formed to be approximately ⅛ inch thick. However, the thickness of the bracket 102 and wings 102a may vary depending on the length of the face plate screws S in which the bracket 102 is intended to be attached. Once the face plate screws S are loosened by at least ⅛ inch, opposite sides of the bracket 102 can be compressed by an amount such that the slots 102a1 can be slid onto the respective face plate screws S. Once the face plate screws S are inserted into the respective slots 102a1 the face plate screws S can be tightened to secure the bracket 102 in place over the GFCI outlet.

The bracket 102 can include a hole 102b at a rear portion (between the opposite sides) thereof in which a retractable electric linear actuator 104 can be fastened thereto. More specifically, the retractable linear actuator 104 can include an actuator bolt 104b that extends from a back end thereof to be inserted through the hole 102b from an inner portion of the bracket 102 such that the actuator bolt 104b extends outwardly from the hole 102b of the bracket 102. In order to stabilize the actuator 104 within the bracket 102 a fender washer 110 can be placed at both an inner and an outer surface of the rear portion of the bracket 102 and surrounding the hole 102b. The actuator bolt 104b can be inserted through a first fender washer 110, through the hole 102b of the bracket 102 and through a second fender washer 110. A thumb wheel nut 112 can then be threaded over the actuator bolt 104b to secure the actuator 104 within the bracket 102. The hole 102b in the bracket 102 is preferably disposed at a position which results in an extendable tip 104a of the actuator 104 being positioned directly adjacent to a reset button R of the GFCI outlet circuit. It is to be noted that the actuator 104 can be connected to the bracket 102 according to any alternative equivalent means which will provide the intended purpose of fastening the actuator 104 to the bracket 102 such that the extendable tip 104a of the actuator 104 will be positioned adjacent to a reset button of a GFCI outlet circuit.

It is to be noted that although an actuator 104 is described herein to reset a GFCI outlet circuit, any alternative equivalent device may be used which will provide the intended purpose of resetting a GFCI outlet circuit without departing from the spirit and scope of the overall invention as described herein.

Electrically connected to the actuator 104 via an electrical wiring can be a four-conductor connector 114. The four-conductor connector 114 is preferably attached to an inner surface of the bracket 102 and partly extends through one of the sides thereof to receive an external connector, as described in more detail below. The four-conductor connector 114 can be electrically connected at two contacts thereof to an outlet plug 118 via electrical wires and at another two contacts thereof to the actuator 104. Once the outlet plug 118 is plugged into the GFCI outlet circuit electrical power will be supplied to the four-conductor connector 114.

A wiring 116 is provided with a connector 116a connected to one end thereof and a connector 116b connected to a second end thereof. The connector 116a is configured to connect to the four-conductor connector 114 and the connector 116b is configured to connect to a four-conductor connector of an electrical circuit control housing 200, according to an exemplary embodiment of the present inventive concept, which is described in more detail below with reference to FIGS. 3A and 3B.

FIG. 3A illustrates a top view of an electrical circuit control housing 200 according to an exemplary embodiment of the present inventive concept. FIG. 3B illustrates a side view of the electrical circuit control housing 200 according to the exemplary embodiment of FIG. 3A.

The electrical circuit control housing 200 is configured to supply a DC battery power to the actuator 104 through the four-conductor connector 114 when the GFCI becomes tripped, and can be configured as described below. However, it is to be noted that the electrical circuit control housing 200 can be configured with any alternative equivalent circuitry which will perform the intended purposes of activating the actuator 104 when a GFCI outlet circuit becomes tripped.

According to an exemplary embodiment, the electrical circuit control housing 200 can include an 18 volt (v) DC battery 210 attached to an outer rear surface thereof and a four-conductor connector 214 attached to an inner surface thereof. The four-conductor connector 214 is configured to extend partly through a side of the electrical circuit control housing 200 to receive the electrical power from the four-conductor connector 114. More specifically, the four-conductor connector 214 is configured to be connectable to the connector 116b of the wiring 116 and receive the electrical power from the four-conductor connector 114 when power is provided from the outlet plug 118 of the automatic GFCI reset apparatus 100 to the four-conductor connector 114. The four-conductor connector 214 is also configured to provide the 18 v DC battery power to the four-conductor connector 114 through the wiring 116 (via connector 116b) when the electrical power from the outlet plug 118 is terminated, as described in more detail below.

Figure 4:
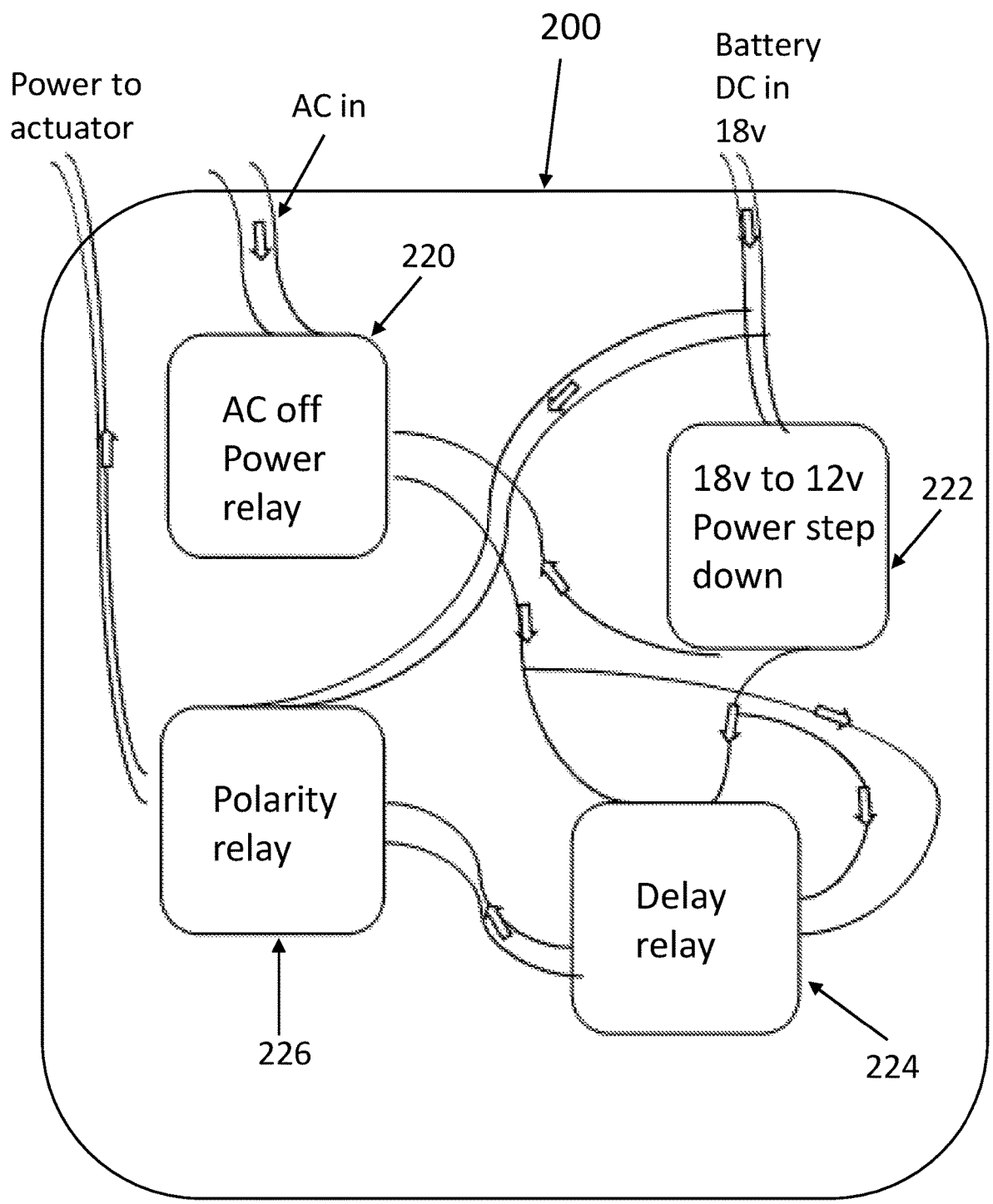
FIG. 4 illustrates electrical circuitry of the electrical circuit control housing illustrated in FIGS. 3A and 3B, according to an exemplary embodiment of the present inventive concept.

FIG. 4 illustrates electrical circuitry of the electrical circuit control housing 200 illustrated in FIGS. 3A and 3B, according to an exemplary embodiment of the present inventive concept. Referring to FIG. 4, the electrical circuit control housing 200 can also include an AC off power relay 220, a power step down unit 222, a delay relay 224, and a polarity relay 226. The power step down 222 converts the 18 v DC power received from the DC battery down to 12 v. The 12 v power is then sent to power the delay relay 224 and to the AC off power relay to activate the AC off power relay 220 and the delay relay 224. The four-conductor connector 214 receives AC power from the outlet plug 118 and also sends the 18 v battery power to the actuator 104 when the electrical power from the outlet plug 118 is terminated. More specifically, the electrical power received by the four-conductor connector 214 from the outlet plug 118, via the four-conductor connector 114, is sent to the AC off Power relay 220. When the electrical power to the AC off Power relay 220 is terminated, which is caused whenever the GFCI outlet circuit is tripped, the AC off Power relay 220 will automatically switch over to the 12 v battery DC power received from the Power step down unit 222. At this point the delay relay will delay for approximately a 3-4 second time period before sending the 12 v step down power to the polarity relay 226. The polarity relay 226 will then be energized and send the 18 v DC power, received directly from the 18 v DC battery 210, to the actuator 104 through the four-conductor connector 214, the wiring 116 and the four-conductor connector 114. The retractable tip 104a of the actuator will then extend outward and depress the GFCI outlet circuit reset button R. The polarity relay 226 will then reverse polarity to the actuator 104, which will cause the retractable tip 104a of the actuator 104 to retract back into the actuator 104 and release the GFCI outlet circuit reset button R. At this point power is restored to the GFCI outlet circuit and the AC off power relay 220 automatically disables the DC battery power.

When the GFCI outlet circuit becomes tripped again by another outlet being tested, the AC off Power relay 220 will lose the AC electrical power, and will automatically switch over to the 12 v battery DC power received from the Power step down unit 222. Once again, after approximately 3-4 seconds the delay relay 224 will send the 12 v DC power to the polarity relay 226, which will once again become energized and send the 18 v DC power to the actuator 104, which will once again extend the retractable tip 104a and depress the GFCI outlet circuit reset button R to restore power to the GFCI outlet circuit.

Each time one of the outlets along the same electric circuit path as the GFCI outlet circuit is tested, the same process as described above will be repeated, until all of the outlets along the same electric circuit path as the GFCI outlet circuit are tested.

According to another exemplary embodiment, the four-conductor connector 114 of the automatic GFCI reset apparatus 100 can be connected to an external 18 v DC battery source which is configured to supply both an 18 volt DC power to the actuator 104 via the four-conductor connector 114 when the controlling GFCI outlet circuit becomes tripped, thus causing the retractable tip 104a of the actuator 104 to extend outward and reset the controlling GFCI outlet circuit, and then to send a reverse polarity 18 volt DC power to the actuator 104 via the four-conductor connector 114, thus causing the retractable tip 104a of the actuator 104 to release the reset button R of the controlling GFCI outlet circuit.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A system to automatically reset a ground fault circuit interrupter (GFCI) outlet, comprising:
   a U-shaped bracket with opposing ends thereof including wings extending perpendicularly outward, each of the opposing ends having a slot formed at a center thereof to receive therein corresponding faceplate screws of an electrical outlet face plate;
   a linear actuator attached to an inner surface of the bracket such that a retractable tip thereof faces a reset button on a GFCI outlet when face plate screws of an electrical outlet face plate are received in the corresponding slots of the bracket;
   an outlet plug configured to be inserted into the GFCI outlet to receive electrical power;
   a first conductor connector connected to the outlet plug to receive electrical power therefrom and separately connected to the linear actuator; and
   an external electrical housing electrically connected to the first conductor connector to receive electrical power therefrom and including an 18 volt DC battery and delay/relay circuitry, wherein when the electrical power thereto is terminated the delay/relay circuitry is configured to delay for a predetermined amount of time and then enable the 18 volt DC battery power to be provided to the linear actuator through the first conductor connector to actuate the retractable tip to extend outward and depress the reset button on the GFCI outlet and then reverse polarity to the linear actuator to cause the retractable tip to retract away from the reset button on the GFCI outlet.

2. The system according to claim 1, wherein the delay and relay circuit comprises:
- a second conductor connector to receive the electrical power from the first conductor connector and to supply the 18 volt DC battery power to the first conductor connector;
- an AC off power relay to receive the electrical power from the second conductor connector;
- a power step down relay to receive the 18 volt DC power from the DC battery, to step down the 18 volts to 12 volts and to supply the 12 volts to the AC off power relay;
- a delay relay to receive the electrical power from the AC off power relay and the 12 volts from the power step down relay, and configured to delay for a predetermined amount of time when electrical power is cut off from the AC off power relay and then enable transmission of the 12 volts; and
- a polarity relay configured to receive the 18 volts DC battery power from the DC battery and the 12 volts from the delay relay when the delay relay transmits the 12 volts, and to transmit the 18 volts DC battery power to the linear actuator through the second conductor connector and the first conductor connector to extend the retractable tip of the actuator outward when the 12 volts from the delay relay is received and then to transmit a reverse polarity to the linear actuator to retract the retractable tip of the actuator.

3. The system according to claim 1, wherein the U-shaped bracket is made of a metal material.

4. A system to automatically reset a ground fault circuit interrupter (GFCI) outlet, comprising:
- a bracket with opposing ends thereof extending perpendicularly outward, each of the opposing ends having a slot formed at a center thereof to receive therein corresponding face plate screws of an electrical outlet face plate;
- a linear actuator attached to an inner surface of the bracket such that a retractable tip thereof faces a reset button on a GFCI outlet when the screws of the face plate are received in the corresponding slots of the bracket;
- a connector connected to the linear actuator and having a DC port to receive a DC power;
- an external DC battery disposed outside the bracket to supply DC power to the connector; and
- a control unit connected to the DC battery to enable the DC power from the DC battery to be supplied to the linear actuator through the connector when power to the GFCI outlet is tripped to extend the retractable tip of the actuator and depress the reset button on the GFCI outlet, and then to enable a DC reverse polarity from the DC battery to the linear actuator through the connector to retract the retractable tip of the actuator.

* * * * *